UNITED STATES PATENT OFFICE.

GEORG EICHELBAUM, OF KÖNIGSBERG, GERMANY, ASSIGNOR TO FRIEDRICH HORNIG, OF TAUCHA, GERMANY.

ADHESIVE PRODUCT.

SPECIFICATION forming part of Letters Patent No. 656,884, dated August 28, 1900.

Application filed June 12, 1899. Serial No. 720,196. (No specimens.)

*To all whom it may concern:*

Be it known that I, GEORG EICHELBAUM, a subject of the King of Prussia, German Emperor, and a resident of Königsberg, Kingdom of Prussia, Germany, have invented a new and useful Improvement in Adhesive Substances from Beet-Root, of which the following is a specification.

In the United States Patent No. 608,363, granted to me on the 2d of August, 1898, for a process of making adhesives I have described a process of manufacturing an adhesive or glutinous substance from lixiviated beet-root chips by treating the said chips with hot watery sulfurous acid or a watery solution of the bisulfites of the alkalies or earthy alkalies. Although the adhesive substance obtained from beet-roots in its chemical composition and in its qualities for industrial purposes very nearly resembles the arabic gum, I have found that the adhesive substance obtained from beet-roots differs materially in some points from the natural gum, (arabic.)

The adhesive substance obtained by any process from beet-roots differs from the natural gum (gum-arabic) as follows: The arabic gum is a mixture of at least two kinds of gum in varying proportions, of which in the spectroscope the one proves to be levogyrate and the other to be dextrogyrate. In the arabic gum the dextrogyrate kind prevails. The adhesive substance gained from beet-roots is also a mixture of two kinds of gum, but the levogyrate prevails in it. Arabic gum will therefore yield less arabinose than beet-root gum. A further difference between the natural gum (arabic gum) and that obtained from treating beet-root chips is to be noticed in the chemical constitution of the two gums. If arabic gum is dissolved in water and alkali or ammonia is added to the solution, the latter will not change. If, however, a solution of the beet-root gum is treated in the same manner, the entire mass will immediately become gelatinous. This tendency of becoming gelatinous may, however, be annulled by boiling the solution previously with bioxid of hydrogen.

The above-stated compositions and qualities of the adhesive substance obtained from beet-root constitute essential differences from other adhesive matter or natural gums, and while the process of my patent hereinbefore described is most advantageous for the manufacture of the adhesive substance of the present application because of its cheapness I am not at all limited to the use of said process, as other processes may be employed.

I claim—

An adhesive substance obtained from beet-root chips, in which the levogyrate kind of gum is prevalent over the dextrogyrate kind and of which adhesive substance a solution in water will immediately become gelatinous by adding alkali or ammonia.

In testimony that I claim the foregoing as my invention I have signed my name, in presence of two witnesses, this 25th day of May, 1899.

GEORG EICHELBAUM.

Witnesses:
  WOLDEMAR HAUPT,
  HENRY HASPER.